US012268213B2

(12) United States Patent
Ruhe et al.

(10) Patent No.: US 12,268,213 B2
(45) Date of Patent: Apr. 8, 2025

(54) OVEN WITH IMPROVED BURNER ASSEMBLY

(71) Applicant: J.C. Ford Company, La Habra, CA (US)

(72) Inventors: Scott D. Ruhe, Yorba Linda, CA (US); Hiral Joshi, Tustin Ranch, CA (US); Donovann Rodgers, Redondo Beach, CA (US); Paul Winocur, Lake Forest, CA (US)

(73) Assignee: J.C. Ford Company, Columbia, TN (US)

( * ) Notice: Subject to any disclaimer, the term of this patent is extended or adjusted under 35 U.S.C. 154(b) by 656 days.

(21) Appl. No.: 17/520,563

(22) Filed: Nov. 5, 2021

(65) Prior Publication Data

US 2023/0141756 A1  May 11, 2023

(51) Int. Cl.
  *F23D 14/02*  (2006.01)
  *A21B 1/33*  (2006.01)
  *A21B 1/48*  (2006.01)
  *F23D 14/26*  (2006.01)
  *F23K 5/00*  (2006.01)
  *F23N 5/24*  (2006.01)
  *F27B 9/36*  (2006.01)

(52) U.S. Cl.
  CPC .................. *A21B 1/33* (2013.01); *A21B 1/48* (2013.01); *F23D 14/02* (2013.01); *F23D 14/26* (2013.01); *F23K 5/005* (2013.01); *F23N 5/24* (2013.01); *F27B 9/36* (2013.01); *F23K 2203/105* (2013.01); *F23K 2400/201* (2020.05); *F23N 2229/00* (2020.01)

(58) Field of Classification Search
  CPC .. A21B 1/33; A21B 1/48; F23D 14/02; F23D 14/26; F23K 5/005; F23K 2203/105; F23N 5/24; F23N 2229/00; F27B 9/36
  USPC .......................................................... 431/8
  See application file for complete search history.

(56) References Cited

U.S. PATENT DOCUMENTS

| 2,116,854 | A | * | 5/1938 | Teller | F24C 15/16 |
| | | | | | 126/41 R |
| 3,092,169 | A | * | 6/1963 | Lohman | F23D 14/045 |
| | | | | | 431/286 |
| 4,273,791 | A | * | 6/1981 | Hanson | A21B 5/08 |
| | | | | | 426/441 |
| 4,643,670 | A | * | 2/1987 | Edwards | F23D 14/70 |
| | | | | | 239/522 |
| 5,410,988 | A | * | 5/1995 | Miyama | C10G 9/206 |
| | | | | | 122/18.4 |
| 5,918,533 | A | * | 7/1999 | Lawrence | A21B 5/03 |
| | | | | | 425/363 |

(Continued)

*Primary Examiner* — Avinash A Savani
(74) *Attorney, Agent, or Firm* — Knobbe, Martens, Olson & Bear, LLP

(57) ABSTRACT

A multi-deck burner assembly for a conveyor-type oven can include a central manifold feeding fuel to upstream and downstream arrays of burners. Other burner assemblies can include pilot burners disposed at approximately a midway point along a longitudinal direction of the burners, thereby enabling the use of longer burners, and thus more efficient burner assembly design. Some burner assemblies can include both a centrally located manifold feeding upstream and downstream arrays and pilot burners disposed at approximately midpoints along the longitudinal lengths of both the upstream and downstream arrays.

21 Claims, 7 Drawing Sheets

(56) References Cited

U.S. PATENT DOCUMENTS

| | | | | |
|---|---|---|---|---|
| 5,979,302 A * | 11/1999 | Funk | ............... | A21B 5/03 |
| | | | | 99/477 |
| 6,200,131 B1 * | 3/2001 | Birch | ............... | F23C 5/02 |
| | | | | 431/155 |
| 2009/0208892 A1 * | 8/2009 | Kozman | ............ | A21B 1/48 |
| | | | | 432/136 |

* cited by examiner

OVEN WITH IMPROVED BURNER ASSEMBLY

BACKGROUND OF THE INVENTIONS

Field of the Inventions

The present inventions relate to ovens, including burner assemblies for large ovens.

Description of the Related Art

A variety of corn and flour food products, such as tortillas and chips, are made at a commercial scale with large, specialized ovens. A standard oven used in the tortilla production industry consists of multiple decks upon which the tortillas travel as they are being cooked. Each deck typically includes a conveyor belt rotating around several cooking burners.

Various problems exist with current ovens. Not only do such ovens consume a great deal of energy, they also require tremendous amount of time and monetary expense to build and adjust for uniform cooking. Thus, parts costs and labor costs for building and operating large ovens are significantly impacted with designs that have higher part counts, higher numbers of assemblies that must be inserted into the internal oven cavity, and more varied arrangements or burners.

SUMMARY OF THE INVENTIONS

An aspect of at least one of the inventions disclosed herein includes the realization that a burner assembly can be made and installed in a more efficient fashion where the burner assembly includes a central manifold for feeding a fuel mixture to both upstream and downstream arrays of burners. Such a design enables a longer, easier to manufacture and assemble, burner assemblies that can be inserted below the upper surface of a conveyor typically used in large commercial ovens. For example, in such a design, the burner assembly includes an array of upstream burners and an array of downstream burners, all of which are fed air-fuel mixture from a single, centrally disposed manifold. The manifold can include an array of upstream runners and an array of downstream runners feeding the upstream and downstream burners, respectively. This type of arrangement provides a more efficient burner assembly which is easier to assemble within the internal cavity of an oven.

Additionally, such an arrangement provides the optional placement of air-fuel flow adjustment valves in close proximity to one another, thereby providing a user with a single location at which they can stand and access the adjustment valves for all of the burners on a single level of a multi-level oven. In some embodiments, the burner assembly can be a multi-level burner assembly, with the intake manifolds stacked vertically. This can provide a simplified plumbing for connecting all of the manifolds to a source of the appropriate air-fuel mixture. Additionally, such an orientation can provide further ease of adjustment of air-fuel mixture flow valves associated with each of the manifolds, efficiently arranged in a vertical spacing. Such an arrangement also provides a user with the option of being located in a single position yet having access to all of the flow control valves for all of the levels of a multi-level oven.

Thus, in some embodiments, an oven can include a tortilla oven can comprise an oven enclosure defining an interior, a multi-deck conveyor comprising first, second and third conveyor assemblies, each conveyor assembly comprising an open-type endless conveyor member supported by first and second rotating supports supporting the open-type endless conveyor for rotation causing an upper surface of the open-type endless conveyor member to translate along a conveyance direction, an input end, and an output end. A multi-deck burner assembly comprising first, second and third burner decks, disposed below the upper surfaces of the open-type endless conveyor members of the first second, and third conveyor assemblies, respectively, can comprise an intake manifold comprising an intake port, an interior chamber, an upstream output port and a downstream output port, the intake port configured for connection to a source of a gaseous air-fuel mixture, an upstream plurality of gas output runners connected to the upstream output port of the intake manifold, each of the upstream plurality of gas output runners comprising an inlet end, an output end, an internal passage connecting the inlet end and the outlet end, and an adjustable valve disposed in the internal passage and configured to adjustable restrict flow of the gaseous air-fuel mixture through the internal passage, a downstream plurality of gas output runners connected to the downstream output port of the intake manifold, each of the downstream plurality of gas output runners comprising an inlet end, an output end, an internal passage connecting the inlet end and the outlet end, and an adjustable valve disposed in the internal passage and configured to adjustable restrict flow of the gaseous air-fuel mixture through the internal passage, an upstream plurality of longitudinally extending burners, each comprising an inlet opening connected to the output end of one of the plurality of upstream gas output runners, a closed terminal end, an internal passage portion extending from the inlet opening to the closed terminal end along an upstream direction relative to the conveyance direction, an air/fuel mixture diffuser extending through a wall of the internal passage portion and configured to discharge the gaseous air/fuel mixture from the internal passage portion into the interior of the oven enclosure, and a cradle portion disposed midway between the inlet opening and the closed terminal end, the cradle portion comprising a concave recess defined in an upper portion of the internal passage portion, and a convex by pass portion defining a lower portion of the internal passage extending under the cradle portion, a downstream plurality of longitudinally extending burners, each comprising an inlet opening connected to the output end of one of the plurality of downstream gas output runners, a closed terminal end, an internal passage portion extending from the inlet opening to the closed terminal end along a downstream direction relative to the conveyance direction, an air/fuel mixture diffuser extending through a wall of the internal passage portion and configured to discharge the gaseous air/fuel mixture from the internal passage portion into the interior of the oven enclosure, and a cradle portion, the cradle portion comprising a concave recess defined in an upper portion of the internal passage portion, and a convex by pass portion defining a portion of the internal passage extending under the cradle portion, an upstream pilot flame burner extending latitudinally relative to the upstream plurality of longitudinally extending burners, the upstream pilot flame burner comprising a pilot air/fuel mixture passage having an upper wall, and an upstream pilot air/fuel mixture diffuser extending through the upper wall and configured to discharge the pilot air/fuel mixture from the pilot air/fuel mixture into the interior of the oven, the upstream pilot flame burner extending across and nested in all of the cradle portions of the upstream plurality of longitudinally extending burners, with an upper surface of the upstream pilot flame burner being disposed at approximately a same height as adjacent upper surfaces of the upstream plurality of longitudinally extending burners, a downstream pilot flame burner extending latitudinally relative to the downstream plurality of longitudinally extending burners, the downstream pilot flame burner comprising a pilot air/fuel mixture passage having an upper wall, and a downstream pilot air/fuel mixture diffuser extending through the upper wall and configured to discharge the pilot air/fuel mixture from the pilot air/fuel mixture passage into the interior of the oven, the downstream pilot flame burner extending across and nested in all of the cradle portions of the downstream plurality of longitudinally extending burners, with an upper surface of the downstream pilot flame burner being disposed at approximately a same height as adjacent upper surfaces of the downstream plurality of longitudinally extending burners, at least a first upstream flame sensor positioned adjacent the upstream pilot air/fuel mixture diffuser and configured to detect a presence of flame at the upstream pilot flame burner, and at least a first downstream flame sensor positioned adjacent the downstream pilot air/fuel mixture diffuser and configured to detect a presence of flame at the downstream pilot flame burner.

In other embodiments, an oven can comprise an oven enclosure defining an interior, a multi-deck conveyor comprising a plurality of conveyor assemblies, each conveyor assembly comprising an input end, an output end, and an open-type endless conveyor member supported by first and second rotating supports supporting the open-type endless conveyor for rotation causing an upper surface of the open-type endless conveyor member to translate along a conveyance direction. A multi-deck burner assembly comprising a plurality of burner decks, disposed below the upper surfaces of the open-type endless conveyor members of the plurality of conveyor assemblies decks, respectively, can comprise an intake manifold comprising an intake port, an interior chamber, an upstream output port and a downstream output port, the intake port configured for connection to a source of a gaseous air-fuel mixture, an upstream plurality of gas output runners connected to the upstream output port of the intake manifold, each of the upstream plurality of gas output runners comprising an inlet end, an output end, an internal passage connecting the inlet end and the outlet end, a downstream plurality of gas output runners connected to the downstream output port of the intake manifold, each of the downstream plurality of gas output runners comprising an inlet end, an output end, an internal passage connecting the inlet end and the outlet end, an upstream plurality of longitudinally extending burners, each comprising an inlet opening connected to the output end of one of the plurality of upstream gas output runners, a closed terminal end, an internal passage portion extending from the inlet opening to the closed terminal end along an upstream direction relative to the conveyance direction, an air/fuel mixture diffuser extending through a wall of the internal passage portion and configured to discharge the gaseous air/fuel mixture from the internal passage portion into the interior of the oven enclosure, a downstream plurality of longitudinally extending burners, each comprising an inlet opening connected to the output end of one of the plurality of downstream gas output runners, a closed terminal end, an internal passage portion extending from the inlet opening to the closed terminal end along a downstream direction relative to the conveyance direction, an air/fuel mixture diffuser extending through a wall of the internal passage portion and configured to discharge the gaseous air/fuel mixture from the internal passage portion into the interior of the oven enclosure, an upstream pilot flame burner extending latitudinally relative to the upstream plurality of longitudinally extending burners, the upstream pilot flame burner comprising a pilot air/fuel mixture passage having an upper wall, and an upstream pilot air/fuel mixture diffuser extending through the upper wall and configured to discharge the pilot air/fuel mixture from the pilot air/fuel mixture into the interior of the oven, and a downstream pilot flame burner extending latitudinally relative to the downstream plurality of longitudinally extending burners, the downstream pilot flame burner comprising a pilot air/fuel mixture passage having an upper wall, and a downstream pilot air/fuel mixture diffuser extending through the upper wall and configured to discharge the pilot air/fuel mixture from the pilot air/fuel mixture passage into the interior of the oven.

In yet other embodiments, a burner assembly for an oven can comprise an intake manifold comprising an intake port, an interior chamber, and an output portion, wherein the intake port configured for connection to a source of a gaseous air-fuel mixture, an upstream plurality of longitudinally extending burners, each comprising an inlet opening fluidically connected to the output portion of the intake manifold and extending away from the manifold along an upstream direction, and a downstream plurality of longitudinally extending burners, each comprising an inlet opening fluidically connected to the output portion of the intake manifold and extending away from the manifold along a downstream direction, generally opposite to the upstream direction.

Another aspect of at least one of the inventions disclosed herein includes the realization that arranging a pilot burner approximately halfway down the length of an array of longitudinally arranged burners allows for a generally longer burner assembly. This is because certain regulations regarding pilot burners include limits on the maximum distance any portion of a burner can be away from a pilot burner. For example, in some jurisdictions, the maximum distance a portion of a burner tube can be from a pilot burner is 60 inches.

Thus, in some embodiments, a burner assembly includes an array of longitudinally extending burners and a pilot burner extending, for example, latitudinally across the array of longitudinally extending burners, at a position approximately halfway between the upstream and downstream ends of the burners. Thus, the burner tubes can be 2× long. This provides a further optional advantage in allowing for longer burners that reduces parts counts, assembly labor, and the required plumbing.

Thus, in some embodiments an oven can comprise an oven enclosure defining an interior, a multi-deck conveyor comprising a plurality of conveyor assemblies, each conveyor assembly comprising an input end, an output end, and an open-type endless conveyor member supported by first and second rotating supports supporting the open-type endless conveyor for rotation causing an upper surface of the open-type endless conveyor member to translate along a conveyance direction. A multi-deck burner assembly comprising a plurality of burner decks, disposed below the upper surfaces of the open-type endless conveyor members of the plurality of conveyor assemblies decks, respectively, can comprise an intake manifold comprising an intake port, an interior chamber, an upstream output port and a downstream output port, the intake port configured for connection to a source of a gaseous air-fuel mixture, an upstream plurality of longitudinally extending burners, each comprising an inlet opening fluidically connected to the upstream output port of the intake manifold, a closed terminal end, an internal passage portion extending from the inlet opening to the closed terminal end along an upstream direction relative to the conveyance direction, an air/fuel mixture diffuser extending through a wall of the internal passage portion and configured to discharge the gaseous air/fuel mixture from the internal passage portion into the interior of the oven enclosure, a downstream plurality of longitudinally extending burners, each comprising an inlet opening fluidically connected to the downstream output port of the intake manifold, a closed terminal end, an internal passage portion extending from the inlet opening to the closed terminal end along a downstream direction relative to the conveyance direction, an air/fuel mixture diffuser extending through a wall of the internal passage portion and configured to discharge the gaseous air/fuel mixture from the internal passage portion into the interior of the oven enclosure, an upstream pilot flame burner extending latitudinally relative to the upstream plurality of longitudinally extending burners, the upstream pilot flame burner comprising a pilot air/fuel mixture passage having an upper wall, and an upstream pilot air/fuel mixture diffuser extending through the upper wall and configured to discharge the pilot air/fuel mixture from the pilot air/fuel mixture into the interior of the oven, the upstream pilot burner positioned at approximately halfway along the longitudinal length of at least one of the upstream plurality of longitudinally extending burners, and a downstream pilot flame burner extending latitudinally relative to the downstream plurality of longitudinally extending burners, the downstream pilot flame burner comprising a pilot air/fuel mixture passage having an upper wall, and a downstream pilot air/fuel mixture diffuser extending through the upper wall and configured to discharge the pilot air/fuel mixture from the pilot air/fuel mixture passage into the interior of the oven, the downstream pilot burner positioned at approximately halfway along a longitudinal length of at least one of the downstream plurality of longitudinally extending burners.

In yet other embodiments, a burner assembly for an oven can comprise an intake manifold comprising an intake port, an interior chamber, and an output portion, wherein the intake port configured for connection to a source of a gaseous air-fuel mixture, at least a first plurality of longitudinally extending burners, each comprising an inlet opening fluidically connected to the output portion of the intake manifold, and at least a first pilot flame burner extending latitudinally relative to the first plurality of longitudinally extending burners, the first pilot flame burner being positioned at approximately a halfway along a length of at least one of the first plurality of first longitudinally extending burners.

DETAILED DESCRIPTION OF THE PREFERRED EMBODIMENT

The inventions disclosed herein have applicability to ovens used in conjunction with continuously moving conveyor systems, such as those used in large, commercial-grade ovens designed for cooking tortillas. Understanding of the inventions disclosed herein is facilitated with the following description of the application of the principles of the present inventions to ovens for baking tortillas, and in particular, ovens that have a multi-deck conveyor system with burner assemblies disposed directly below the conveyor member. However, the inventions disclosed herein can be used in other contexts as well, including smaller ovens and other devices having elongated burners.

Figure 1:
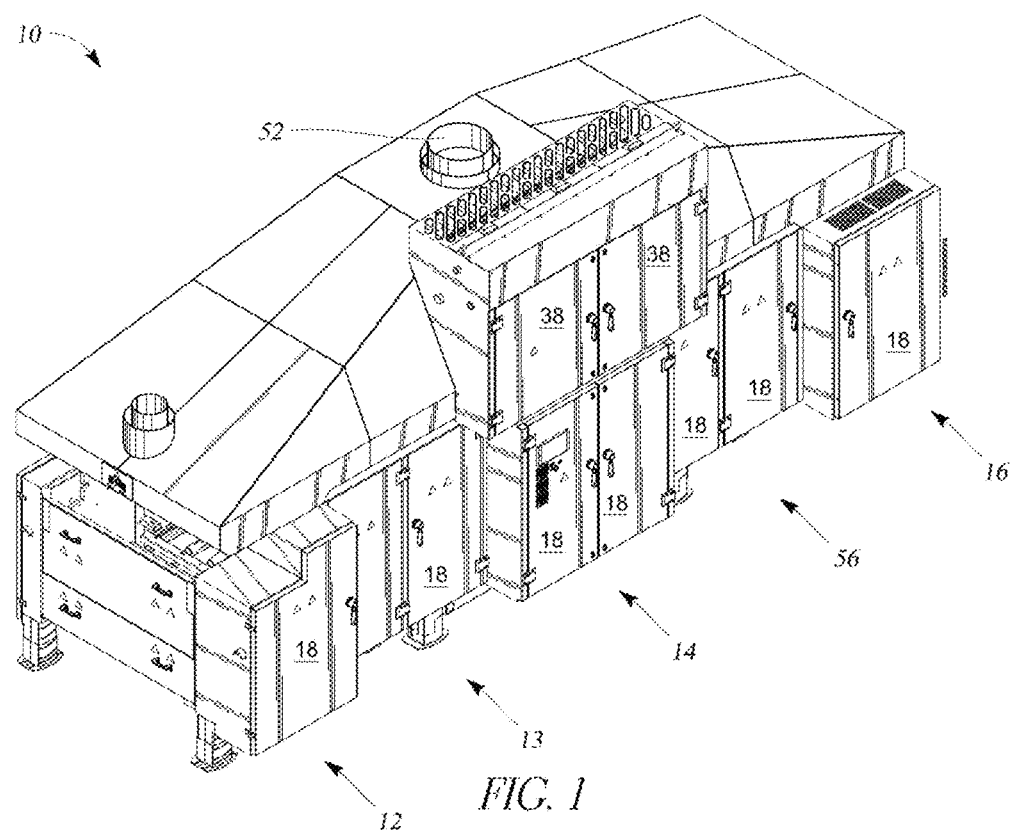
FIG. 1 is a perspective view of an embodiment of an oven including a burner assembly.

With reference to FIG. 1 the oven 10 can include an improved burner assembly 100 described in greater detail below with reference to FIGS. 2-10.

The oven 10 can include an input section 12, a baking section 14, and a discharge section 16 which are typically secured to one another by appropriate fasteners. Each of the sections 12, 14, and 16 can include doors 18 for providing users access to the interior of the oven 30.

Figure 2:
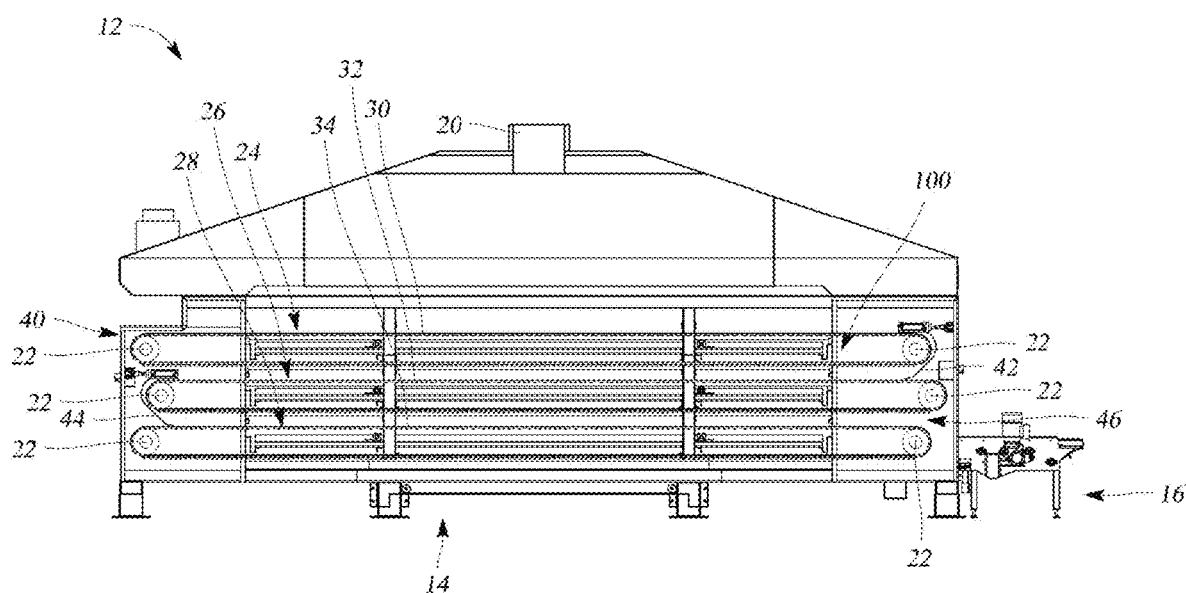
FIG. 2 is a schematic and partial cutaway view of the oven of FIG. 1 illustrating a burner assembly in a side elevational view.

With reference to FIG. 2, the baking section 14 of the oven 30 is shown in more detail. The baking section 14 can include a plurality of structural components which support a plurality of conveyor assemblies and the burner assembly 100. The burner assembly receives a mixture of a desired fuel, typically natural gas, and a selected oxidizer, which is typically air. The air-fuel mixture is directed into the burner assembly 100 with pipes (not shown). The flow of the air-fuel mixture into the burner assembly 100 is controlled by regulators (not shown) as known in the art. The exhaust resulting from the combustion of the air-fuel mixture is discharged through an outlet 20.

The inlet section 12 and the outlet section 16 of the oven 30 can each comprise a plurality of drive shafts 22 for supporting gears for driving endless conveyor members 24, 26, 28. The endless conveyor members 24, 26, 28 can be any type of conveyor, often referred to as a "conveyor belt." However, the conveyor members 24, 26, 28 are typically made from open stainless steel mesh. 7

One or more of the drive shafts 22 for each of the conveyor members 24, 26, 28 are driven by a motor (not shown) for conveying the conveyor members 24, 26, 28 in different directions. For example, the conveyor member 24 can be driven such that its upper surface 30 is driven towards the right (as viewed in FIG. 2), the conveyor member 26 can be driven such that its upper surface 32 is driven towards the left (as viewed in FIG. 2), and the conveyor member 28 is driven such that its upper surface 34 is driven towards the right (as viewed in FIG. 2).

In operation, uncooked food, such as tortillas, are received into the oven 30 at inlet location 40. The tortillas are transported from the inlet location 40 along a generally horizontal plane, on the upper surface 30 of the conveyor member 24. As the tortillas move from the left end of the oven 10 towards the right end (as viewed in FIG. 2), the tortillas pass over a portion of the burner assembly 100, and are thereby heated. When the tortillas reach the right end of the upper conveyor deck, they are directed onto the upper surface 32 of the middle conveyor member 26 by a chute 42. The tortillas then pass from the right end of the oven toward the left end of the oven 10, and again pass over another portion of the burner assembly 100. When the tortillas reach the left end of the middle conveyor deck, they are directed onto the upper surface 34 of the lower most conveyor member 28 by a chute 44. The lower most conveyor member 28 then transports the tortillas over the lower most portion of the burner assembly 100 and ultimately to an outlet 46 of the discharge section 16.

This type of oven 10 can be considered a multi-deck oven including a multi-deck burner assembly 100.

Figure 3:
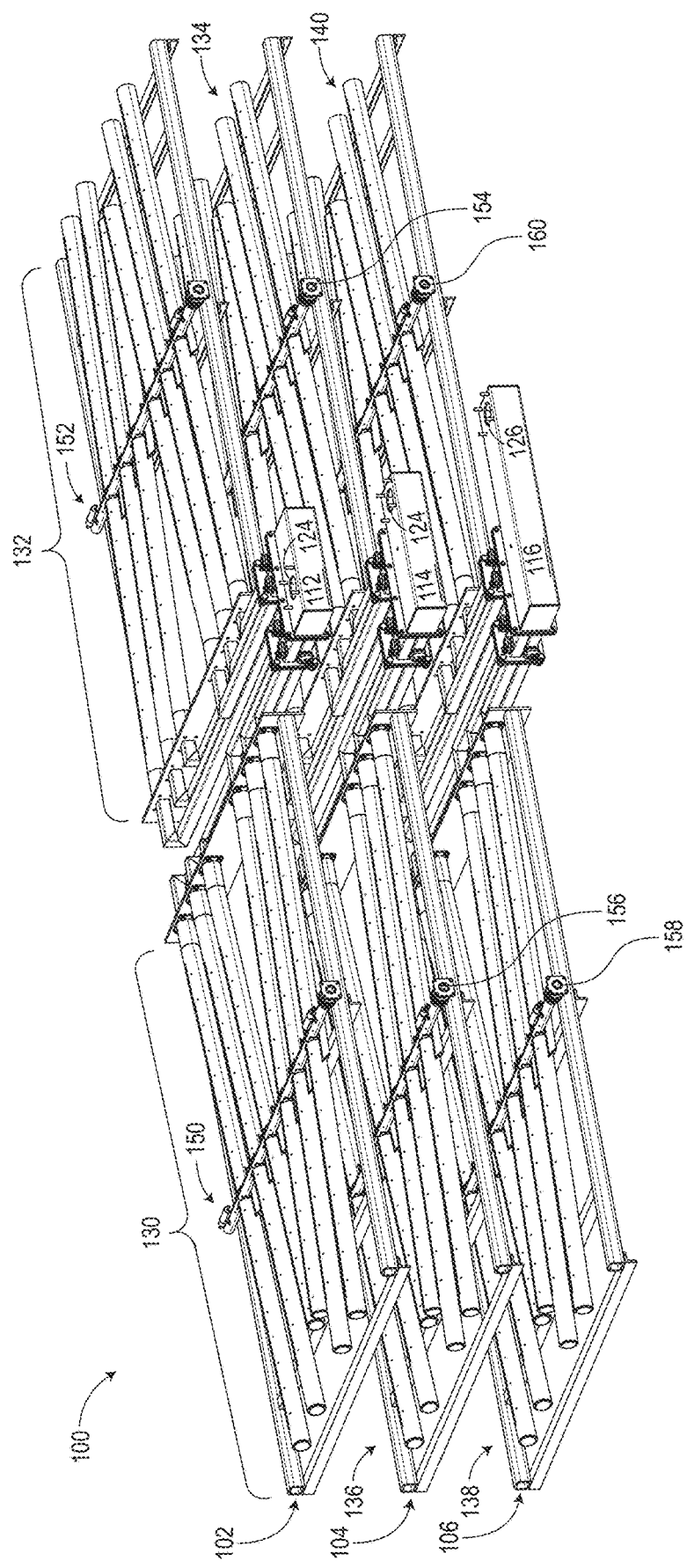
FIG. 3 is a perspective view of the burner assembly removed from the oven of FIGS. 1 and 2.

With reference to FIG. 3, the burner assembly 100 is in the form of a multi-deck burner assembly having a first deck 102, a second deck 104 and a third deck 106. The decks 102, 104, 106 include intake manifolds 112, 114, 116, respectively.

The intake manifolds 112, 114, 116 include inlets 122, 124, 126, respectively. The intake manifolds 112, 114, 116, receive an air-fuel mixture through the inlets 122, 124, 126 and distribute the air-fuel mixture to arrays of upstream and downstream burners. As noted above with reference to FIG. 2, the conveyor members 24, 26, 28 are arranged to transport food articles in alternating directions. Thus, in this context, the burner assembly 100 in FIG. 3 has an alternating arrangement of upstream and downstream burner arrays. For example, the first burner deck 102 includes an upstream burner array 130 arranged on the left side of the manifold 112 and a downstream array 132 arranged on the right side of the manifold 112. The second burner deck 104 includes an upstream burner array 134 and a downstream burner array 136. Finally, the third deck of burner deck 106 includes an upstream burner array 138 and downstream burner array 140.

Each of the burner decks 102, 104, 106 also includes one or more pilot burners. In the illustrated embodiment, the upper deck 102 includes an upstream pilot burner 150 and a downstream pilot burner 152. The second deck 104 includes an upstream pilot burner 154 and a downstream pilot burner 156. The third deck 106 includes an upstream pilot burner 158 and a downstream pilot burner 160. When installed for use, all of the manifolds 112, 114, 116 and all of the pilot burners 150, 152, 154, 156, 158, 160 are attached to air-fuel mixture sources with appropriate plumbing. The air-fuel mixture received by the manifolds 112, 114, 116, is distributed to the upstream and downstream arrays of burners. Further, the pilot burners 150, 152, 154, 156, 158, 160 are operated to ensure that all of the associated burners remain lit during operation.

As shown in FIG. 3, the inlets 122, 124, 126 of the intake manifolds 112, 114, 116, respectively, are horizontally offset from each other and face in a generally upward direction. This helps facilitate connecting the appropriate plumbing to the manifolds 112, 114, 116 so as to provide an air-fuel mixture to all of the inlets 122, 124, 126. Other than the different lengths of the intake manifolds 112, 114, 116, the remaining structural components of the decks 102, 104, 106 can be identical or similar. Thus, below, the detailed description of the first deck 102 applies equally to the second and third decks 104, 106.

Figure 4:
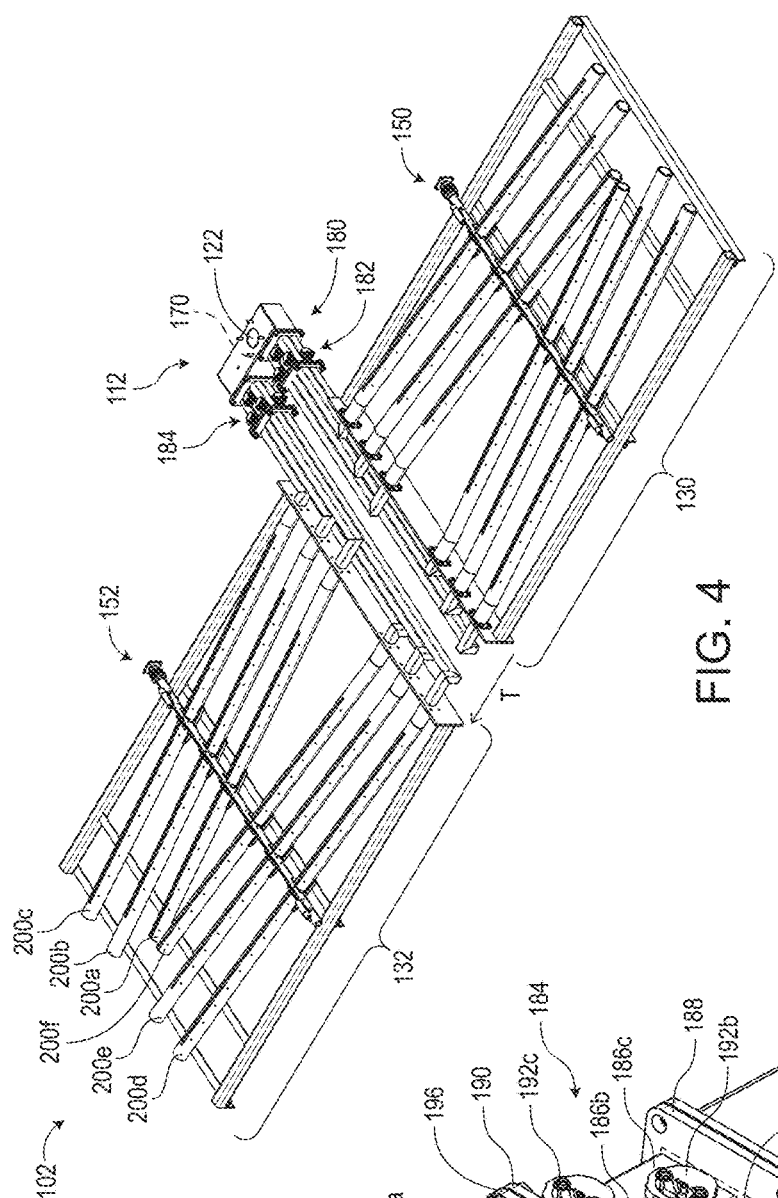
FIG. 4 is a perspective view of a single deck of the burner assembly of FIG. 3.
Figure 5A:
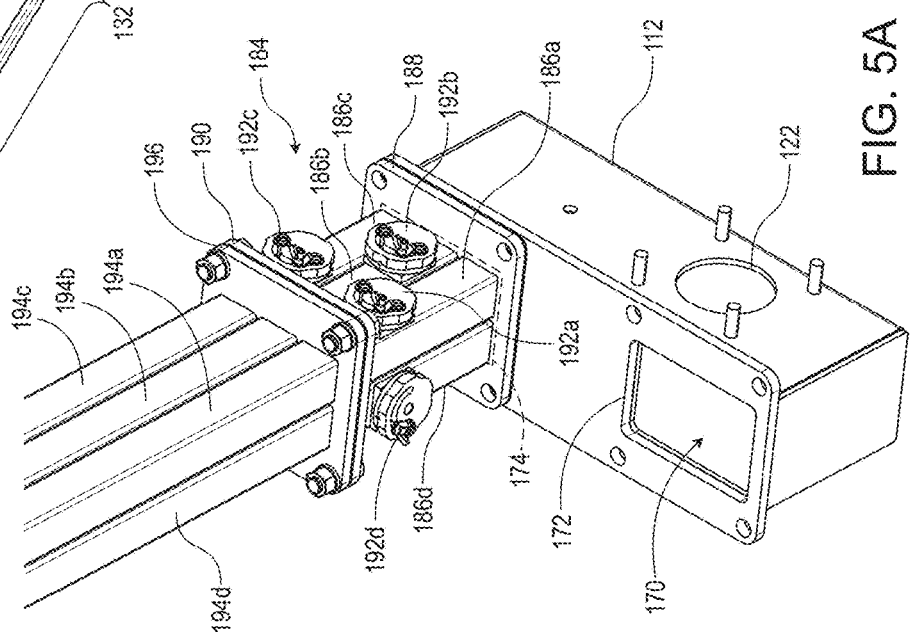
FIG. 5A is an enlarged perspective view of an intake manifold of the burner deck of FIG. 4, with six runners being removed.
Figure 5B:
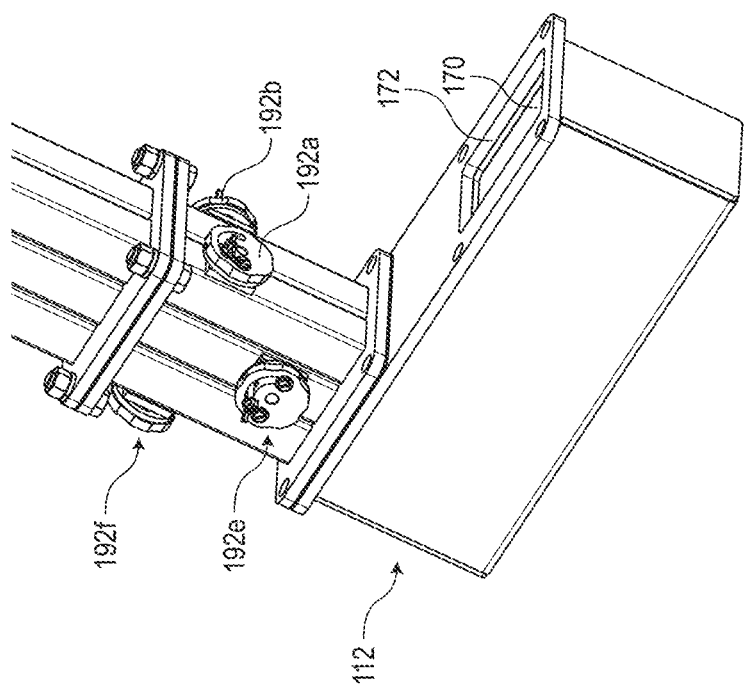
FIG. 5B is another enlarged perspective view of an intake manifold of FIG. 5A.

With reference to FIGS. 4, 5A, and 5B, the intake manifold 112 includes a plurality of outer walls defining an inner chamber or "plenum" 170. Additionally, the intake manifold 112 includes an first outlet port 172 and a second outlet port 174. In operation, air-fuel mixture flows into the inlet 122, into the interior plenum 170, then out through the first and second outlet ports 172, 174.

In the orientation illustrated in FIGS. 2 and 3, the outlet port 172 can be considered an upstream outlet port and the outlet port 174 can be considered a downstream outlet port. As such, the upstream outlet port 172 can be considered as feeding air-fuel mixture to the upstream burner array 130 and the downstream outlet port 174 can serve as feeding air-fuel mixture to the downstream burner array 132.

Optionally, the burner deck 102 can include a throttling body 180. Optionally, the throttling body 180 can be divided into an upstream throttling unit 182 and a downstream throttling unit 184.

With reference to FIGS. 5A and 5B, only the downstream throttling unit 184 is illustrated, however, the upstream throttling unit 182 can have the same or identical construction.

The downstream throttling unit 184 can be in the form of a throttle body having a plurality of individual throttle passages 186a, 186b, 186c, 186d, 186e, 186f (passages 186e and 186 shown in FIG. 5B. Each of the throttle passages 186a-186e can have inlet ends attached to an inlet flange 188 and outlet ends attached to an outlet flange 190. In some embodiments, all of the throttle passages 186a-186f are welded to each other and to the inlet and outlet flanges 188, 190. Additionally, in the illustrated embodiment, the throttle passages 186a-186f have a square cross section. However, other shapes can also be used.

The throttle body 184 also includes a plurality of valves for optional flow control through each of the throttle passages 186a-186f. For example, in the illustrated embodiment, the throttle body 184 includes butterfly valve assemblies 192a, 192b, 192c, 192d, 192e, 192f, attached to the throttle passages 186a-186f, respectively. Each of these butterfly valve assemblies 192a-192f include a valve shaft (not shown), a valve member (not shown) disposed within the associated throttle passage for pivotal movement between opened and closed positions, in a known manner. Adjustment of the butterfly valves between the opened and closed positions can provide a generally proportional control over the flow rate of air-fuel mixture through the throttle passages 186a-186f. In the illustrated embodiment, the butterfly valve assemblies 192a-192f include a knob providing for convenient manual adjustment of the angular position of the butterfly valve, and thereby controlling the air-fuel mixture flow rate. A set screw secures the adjustment knob in the desired position.

The outlet flange 190 of the downstream throttle body 184 can be connected to a plurality of downstream intake runners 194a, 194b, 194c, 194d, 194e, and 194f. Like the throttle passages 186a-186f, the intake runners can be attached to each other and an inlet flange 196 by welding or other techniques. In the illustrated embodiment, the intake runners 194a-194f have approximately the same cross-sectional shape, interior dimensions and exterior dimensions, as the throttle passages 186a-186f, respectively. Aligned as illustrated, each of the throttle passages 186a-186f provide a flow, metered by the associated butterfly valves 192a-192f, into the corresponding intake runners 194a-194f, respectively.

With continued reference to FIG. 4, the intake runners 194a-194f each include outlet ends 196a-196f, respectively. The outlet ends 196a-196f can be attached to a header plate 198. The header plate 198 can include passages about the same size as the interior dimensions of the intake runner outlets 196a-196f. The outlet ends 196a-196f can be attached to the apertures of the header plate 198 by any means, including welding, bonding, etc. In this arrangement, the inlet runners 194a-194f are configured to independently feed the downstream array of burners 132 which includes burner members 200a-200f.

Figure 6:
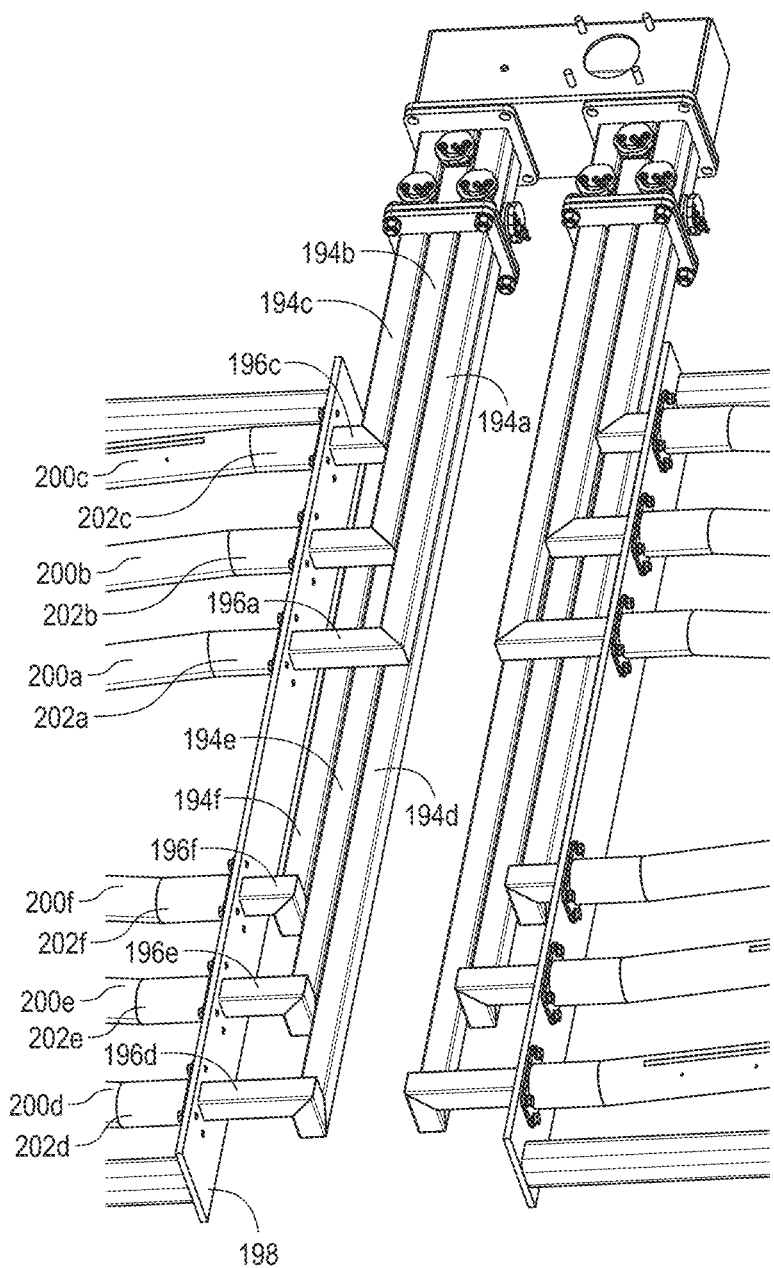
FIG. 6 is an enlarged perspective view of the manifold of the burner deck of FIG. 4.

With continued reference to FIG. 6, the burner members 200a-200f are fluidly connected to the outlets 196a-196f of the intake runners 194a-194f with transition conduits 202a-202f, respectively. The transition conduits 202a-202f are mounted to the header member 198 with inlet ends communicating through the header member 198 with the outlets 196a-196f, respectively. Outlet ends of the transition passages 202a-202f are connected to inlet ends of the burner members 202a-202f, respectively.

Figure 7:
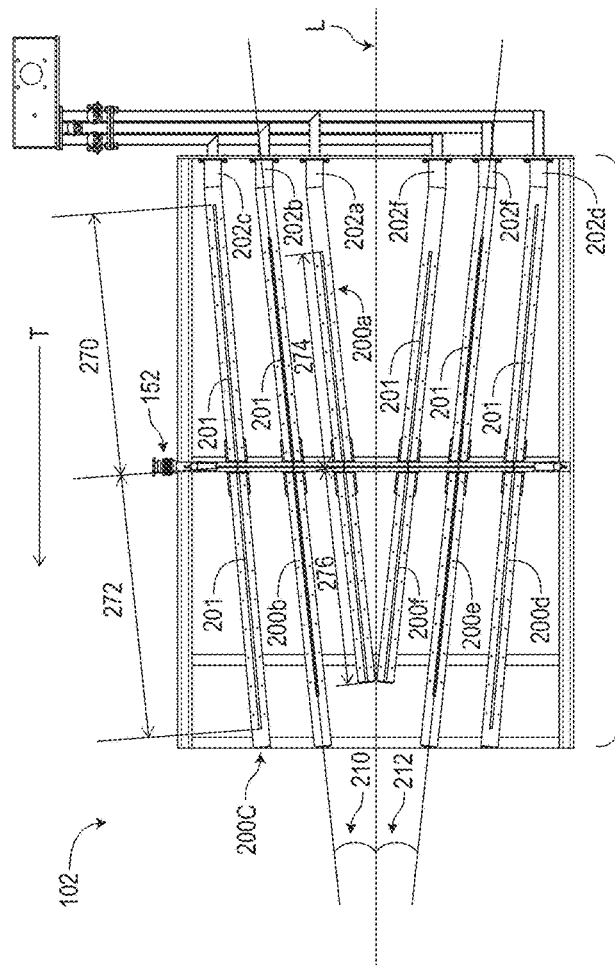
FIG. 7 is a top plan view of half of the burner deck of FIG. 4.

With reference to FIG. 7, the transition passages 202a-202f can be oriented to extend generally longitudinally along the deck 102. In some embodiments, the burner members 202a-202f can also extend longitudinally with or without an angular offset relative to a longitudinal axis L of the deck 102. In some embodiments, the longitudinal axis L can be considered as extending in the direction of movement of the conveyor member associated with the deck 102 (for example conveyor member 24 of FIG. 2). During operation, food products, such as tortillas, would move along or parallel to the longitudinal axis L.

In embodiments where the burner members 200a-200f are angularly offset relative to the longitudinal axis L, a tortilla moving over the deck 102 would pass over the burners in a manner such that flame discharged from the burner members 200a-200f would move from one lateral side of the tortilla to the other lateral side, thereby providing a more even heating and thus even cooking of food products as they pass over the burner deck 102. For example, in some embodiments, the burners 200a-200f can be angularly offset from the longitudinal axis L by an angle between 0 and 90 degrees. With continued reference to FIG. 7, the burner 200b is illustrated as being angularly offset from the longitudinal axis L by an angle 210. The angle 210 can be between 0 and 90 degrees. In some embodiments, the angle 210 is between 75 and 15 degrees. Further, in some embodiments, the angle 210 is between 5 and 25 degrees. As used herein, the term "longitudinally extending" refers to a burner that has a longitudinal component that is larger than its lateral component, for example, where the angle is less than 45 degrees.

In the illustrated embodiment, the burners 200a-200c are all angularly offset from the longitudinal axis L by the same angle. In some embodiments, all of the burners 200a-200f are offset from the longitudinal axis L by the same angle. In other embodiments, the burners on the right side of the longitudinal axis L (burners 200a-200c) are offset by the angle 210 while the burners on the left side of the longitudinal axis L (burners 200d-200f) are offset by an equal but opposite angle 212. Thus, with regard to the longitudinal axis in the direction of travel T of the conveyor member 24 (FIG. 2), the burners 200a-200f converge toward the longitudinal axis L from their upstream ends toward their downstream ends. The desired layout and convergence or divergence of the burner members 200a-200f can be chosen to provide the desired result, for example, more even cooking of food products during operation.

Additionally, with reference to FIG. 4, the burners included in the upstream burner array 130 are arranged in the opposite orientation, i.e., the upstream array of burners are converged at the upstream end (at their terminal ends) and diverge away from each other toward the downstream end (at their inlet ends), relative to the direction of travel T. This mirror imaged orientation of the upstream burner array and downstream burner arrays 130, 132 can help in providing more uniform heating and cooking.

Additionally, with reference to FIGS. 5A and 5B, the butterfly valve assemblies 192a-192f of the throttle bodies 182, 184 provide individual adjustment of the flow rate of the air-fuel mixture fed to each individual burner 200a-200f.

The burner members 200a-200f can be formed in any type of burner configuration. In the illustrated embodiment, the burner members 200a-200f are all formed from a circular cross-sectioned pipe having a groove in their upper wall. The groove is filled with a device known as a "ribbon" 201 which can be formed of a plurality of corrugated sheets of metal layered upon one another to form an array of apertures. When an air-fuel mixture is provided into the interior passages of the burner members 200a-200f, the air-fuel mixture leaks upwardly, out through the ribbon, to support a standing flame thereabove. The ribbon can also be referred to as a "diffuser". This type of burner is well known in the art and is not discussed in further detail.

Figure 8:
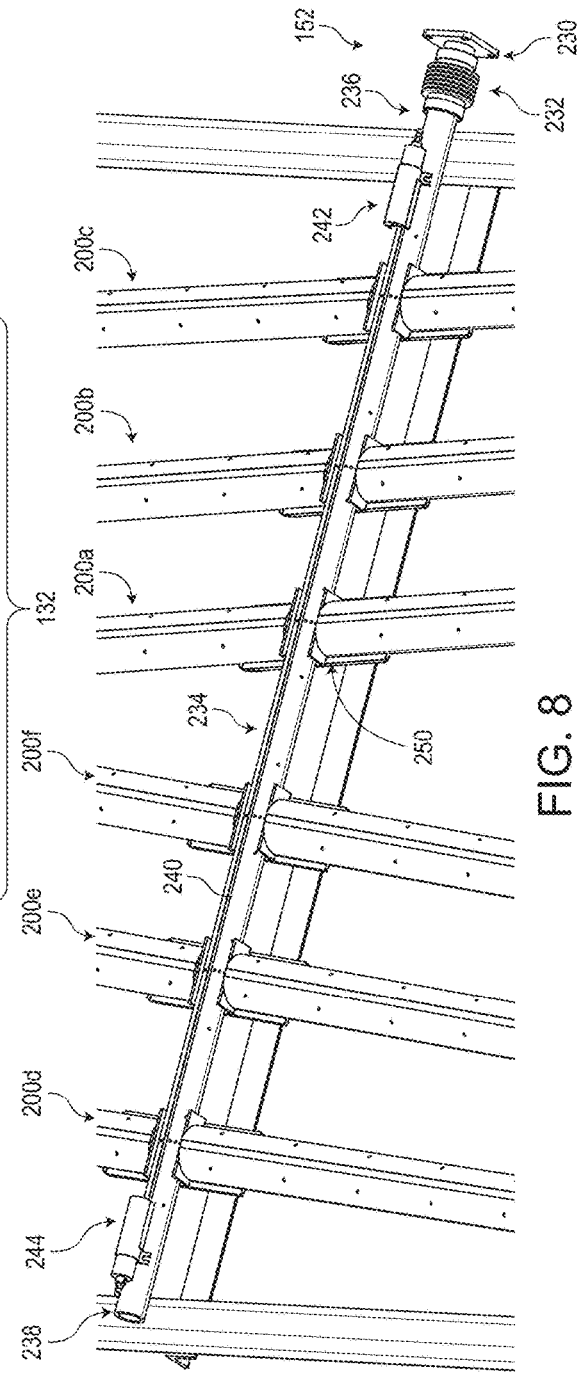
FIG. 8 is an enlarged perspective view of a pilot burner, the pilot burner illustrated in FIG. 7.

With reference to FIG. 8, and as noted above, the downstream array 132 of the deck 102 includes a burner pilot burner assembly 152. The upstream pilot burner assembly 150 can have a similar or identical construction to that of the pilot burner assembly 150 and 154-160, although only the pilot burner assembly 152 is described in detail below.

With reference to FIG. 8, the pilot burner assembly 152 can include an inlet flange 230, a flexible union member 232 and a main pilot burner member 234. The inlet flange 230 can be figured to be connected with a source of air-fuel mixture (not shown). The main pilot burner member 234 can include an inlet end 236 and a terminal end 238. The pilot burner member 234 can be in the form of any type of burner. In the illustrated embodiment, the pilot burner member 234 is the same type of burner as the burner members 200a-200c, however, with a smaller diameter.

As such, the main pilot burner member 234 is in the shape of a pipe having a round cross section, an upper groove, and a ribbon member 240 extending through the groove in the upper surface of the main pilot burner member 234, for discharging a controlled flow of air-fuel mixture from an interior of the member 234, upwardly, to support a stable flame during operation. The pilot burner assembly 152 can also include a combination igniter and flame sensors 242, 244 disposed at opposite ends of the main pilot burner member 234. The combined igniter and flame sensors 242, 238 can include hardware for providing a controlled spark for igniting air-fuel mixtures discharged from the ribbon 240, as well as functionality for detecting the presence of a flame during operation and output to an air-fuel controller system, as is known in the art.

With continued reference to FIG. 8, each of the burner members 200a-200f include cradle portions 250 into which the main pilot burner member 234 is nested. This nesting arrangement helps position the pilot burner assembly 152 in a more desirable orientation and relative positioning for reliable pilot ignition support and even heat distribution. For example, the upper surface of the ribbon member 240 is approximately at the same height as the ribbon members 201 of the burner member 200a.

Figure 9:
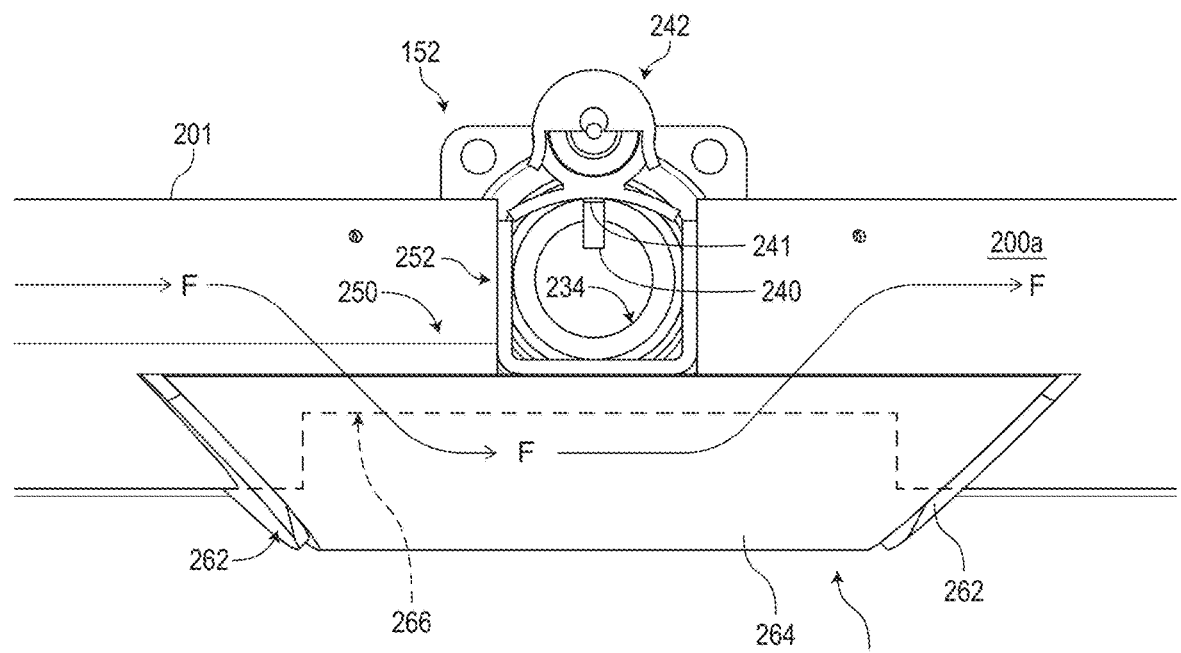
FIG. 9 is an enlarged and partial sectional view of the pilot burner illustrated in FIG. 8.
Figure 10:
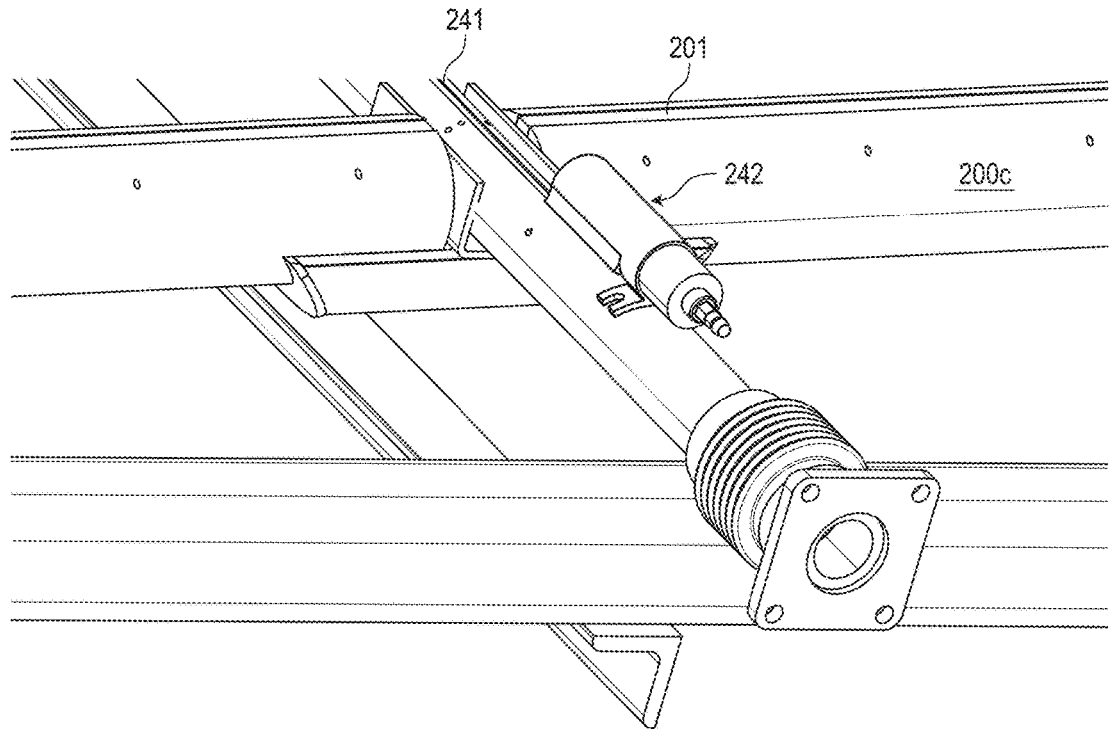
FIG. 10 is an enlarged perspective view of an end of the burner tube of FIG. 8.

For example, as illustrated in FIGS. 9 and 10, the cradle portion 250 of the burner members (burner member 200a being illustrated) includes a U-shaped cradle member 252 disposed in a notch formed in the upper surface of the burner member 200a. The cradle member 252 partially obstructs the internal passage of the burner member 200a. Additionally, the cradle portion includes an underpass 260.

The underpass 260 section includes a convex exterior structure attached to a lower portion of the burner member 200a for providing an substantially unobstructed cross-sectional flow area for air-fuel mixture to flow under the cradle member 252. For example, the underpass portion 260 can include endplates 262 and a central, partially cylindrical portion 264 attached to an outer surface of the burner member 200a. The endplates 262 and central member 264 can be attached to the outer surfaces of the burner member 200a, by welding, or other techniques.

A lower portion of the burner member 200a can include cutout 266 thereby opening the interior of the underpass portion 260 to the interior of the upstream and downstream portions of the burner member 200a. Thus, as shown in FIG. 9, a flow of air-fuel mixture F can flow under the cradle member 252 and the pilot burner assembly 152 with additional cross-sectional flow area so as to avoid a constriction of the air-fuel flow F that would otherwise be caused by the pilot burner assembly 152.

With continued reference to FIG. 7, the ribbon 201 of the burner member 200c is arranged such that the pilot burner assembly 152 passes through approximately a center of the overall length of the ribbon burner. For example, the length 270 of the portion of the ribbon burner of the burner member 200c upstream from the pilot burner assembly 152 is approximately equal to the length 272 of the downstream portion of the ribbon burner member of the burner member 200c. As such, the burner assembly 152 is positioned in a place which helps to maximize the overall allowable length of the burner member 200c.

For example, in some jurisdictions, pilot burners must be placed no more than 60 inches from a pilot burner. Thus, with the pilot burner 152 placed approximately in the center of the ribbon burner 201 of the burner member 200c, the ribbon burner can extend a maximum allowable length in both the upstream and downstream directions. As such, as noted above, this supports the use of the longest possible, compliant, burner members.

As shown in FIG. 7, optionally, the burner members 200a, 200b, 200c can have different overall lengths and different lengths of ribbon burner members 201. For example, the burner member 200a can be oriented such that its upstream length 274 is approximately equal to its downstream length 276, where the overall length (length 274 plus length 276) is less than the overall length of the ribbon burner 201 of burner member 200c (length 270 plus length 272). However, because, in the illustrated embodiment, the ribbon burner 201 of the burner member 200a is shorter than the ribbon burner 201 of burner member 200c, it is not necessary for the ribbon burner 201 of the burner member 200a to be centered along the pilot burner 152. Thus, other orientations can also be used. The ribbon burner of the burner member 200b can be arranged in the same or similar manner.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A burner assembly for an oven, comprising:
an intake manifold comprising an intake port, an interior chamber, and an output portion, the output portion comprising an upstream output port and a downstream output port, wherein the intake port is configured for connection to a source of a gaseous air-fuel mixture;
an upstream plurality of longitudinally extending burners, each comprising an inlet opening fluidically connected to the output portion of the intake manifold and extending away from the intake manifold along an upstream direction;
a downstream plurality of longitudinally extending burners, each comprising an inlet opening fluidically connected to the output portion of the intake manifold and extending away from the intake manifold along a downstream direction, generally opposite to the upstream direction;
an upstream plurality of gas output runners connected to the upstream output port and connected to the upstream plurality of longitudinally extending burners; and
a downstream plurality of gas output runners connected to the downstream output port and connected to the downstream plurality of longitudinally extending burners.

2. The burner assembly according to claim 1, additionally comprising at least a first pilot flame burner extending latitudinally relative to the upstream plurality of longitudinally extending burners.

3. The burner assembly according to claim 2, wherein the first pilot flame burner is positioned at approximately a halfway along a length of at least one of the upstream plurality of longitudinally extending burners.

4. The burner assembly according to claim 1, additionally comprising a plurality of adjustable valves, an adjustable valve of the plurality of adjustable valves disposed in each of the upstream plurality of gas output runners and each of the downstream plurality of gas output runners, the plurality of adjustable valves configured to adjustably restrict flow of the gaseous air-fuel mixture through the upstream plurality of gas output runners and the downstream plurality of gas output runners.

5. A burner assembly for an oven, comprising:
an intake manifold comprising an intake port, an interior chamber, and an output portion, wherein the intake port is configured for connection to a source of a gaseous air-fuel mixture;
an upstream plurality of longitudinally extending burners, each comprising an inlet opening fluidically connected to the output portion of the intake manifold and extending away from the intake manifold along an upstream direction;
a downstream plurality of longitudinally extending burners, each comprising an inlet opening fluidically connected to the output portion of the intake manifold and extending away from the intake manifold along a downstream direction, generally opposite to the upstream direction; and
a throttle assembly fluidically connecting the intake manifold with the upstream plurality of longitudinally extending burners and the downstream plurality of longitudinally extending burners.

6. The burner assembly according to claim 5, wherein the throttle assembly comprises an upstream throttle body including an upstream plurality of throttled passages fluidically connecting the intake manifold with the upstream plurality of longitudinally extending burners and a downstream throttle body including a downstream plurality of throttled passages fluidically connecting the intake manifold with the downstream plurality of longitudinally extending burners.

7. The burner assembly according to claim 6, wherein each throttled passage of the upstream plurality of throttled passages and the downstream plurality of throttled passages comprises a separate throttle passage and a valve configured to adjustably meter a flow of the gaseous air-fuel mixture to only one of the upstream plurality of longitudinally extending burners or the downstream plurality of longitudinally extending burners.

8. A burner assembly for an oven, comprising:
an intake manifold comprising an intake port, an interior chamber, and an output portion, wherein the intake port is configured for connection to a source of a gaseous air-fuel mixture;
an upstream plurality of longitudinally extending burners, each comprising an inlet opening fluidically connected to the output portion of the intake manifold and extending away from the intake manifold along an upstream direction; and
a downstream plurality of longitudinally extending burners, each comprising an inlet opening fluidically connected to the output portion of the intake manifold and extending away from the intake manifold along a downstream direction, generally opposite to the upstream direction,
wherein at least one of the upstream plurality of longitudinally extending burners or the downstream plurality of longitudinally extending burners is angularly offset from a longitudinal axis of the burner assembly.

9. A burner assembly for an oven, comprising:
a first burner deck, comprising:
an intake manifold comprising an intake port, an interior chamber, and an output portion, wherein the intake port is configured for connection to a source of a gaseous air-fuel mixture;
an upstream plurality of longitudinally extending burners, each comprising an inlet opening fluidically connected to the output portion of the intake manifold and extending away from the intake manifold along an upstream direction; and
a downstream plurality of longitudinally extending burners, each comprising an inlet opening fluidically connected to the output portion of the intake manifold and extending away from the intake manifold along a downstream direction, generally opposite to the upstream direction;
a second burner deck having a second intake manifold configured to feed the gaseous air-fuel mixture to a second upstream and downstream pluralities of longitudinally extending burners; and
a third burner deck having a third intake manifold configured to feed the gaseous air-fuel mixture to a third upstream and downstream pluralities of longitudinally extending burners.

10. A burner assembly for an oven, comprising:
an intake manifold comprising an intake port, an interior chamber, and an output portion, wherein the intake port is configured for connection to a source of a gaseous air-fuel mixture;
at least a first plurality of longitudinally extending burners, each comprising an inlet opening fluidically connected to the output portion of the intake manifold;
a throttle assembly fluidically connecting the intake manifold with the first plurality of longitudinally extending burners; and
at least a first pilot flame burner extending latitudinally relative to the first plurality of longitudinally extending burners, the first pilot flame burner being positioned at approximately a halfway along a length of at least one of the first plurality of longitudinally extending burners.

11. The burner assembly according to claim 10 additionally comprising at least a first flame sensor positioned adjacent the first pilot flame burner and configured to detect a presence of flame.

12. The burner assembly according to claim 10, wherein the first pilot flame burner is positioned at approximately a halfway along a length of all of the first plurality of longitudinally extending burners.

13. The burner assembly according to claim 10, wherein at least a one of the first plurality of longitudinally extending burners comprises an upper wall with an air-fuel diffuser extending through the upper wall, the air-fuel diffuser configured to discharge an air-fuel mixture from within an interior of the first pilot flame burner, upwardly to support a stable flame thereabove.

14. A burner assembly for an oven, comprising:
an intake manifold comprising an intake port, an interior chamber, and an output portion, wherein the intake port is configured for connection to a source of a gaseous air-fuel mixture;
a first plurality of longitudinally extending burners, each comprising an inlet opening fluidically connected to the output portion of the intake manifold, wherein the first plurality of longitudinally extending burners extend away from the intake manifold in an upstream direction;
a second plurality of longitudinally extending burners, each comprising an inlet opening fluidically connected to the output portion of the intake manifold and extending away from the intake manifold along a downstream direction, generally opposite to the upstream direction;
a first pilot flame burner extending latitudinally relative to the first plurality of longitudinally extending burners, the first pilot flame burner being positioned at approximately a halfway along a length of at least one of the first plurality of longitudinally extending burners; and
a second pilot flame burner extending latitudinally relative to the second plurality of longitudinally extending burners, the second pilot flame burner being positioned at approximately a halfway along a length of at least one of the second plurality of longitudinally extending burners.

15. The burner assembly according to claim 14, wherein the output portion of the intake manifold comprises an upstream output port and a downstream output port, the burner assembly further comprising at least an upstream plurality of gas output runners connected to the upstream output port of the intake manifold and connected to the first plurality of longitudinally extending burners, and a downstream plurality of gas output runners connected to the downstream output port of the intake manifold and connected to the second plurality of longitudinally extending burners.

16. The burner assembly according to claim 15, additionally comprising a plurality of adjustable valves, an adjustable valve of the plurality of adjustable valves disposed in each of the upstream plurality of gas output runners and each of the downstream plurality of gas output runners, the plurality of adjustable valves configured to adjustably restrict flow of the gaseous air-fuel mixture through the upstream plurality of gas output runners and the downstream plurality of gas output runners.

17. A burner assembly for an oven, comprising:
a first burner deck, comprising:
  an intake manifold comprising an intake port, an interior chamber, and an output portion, wherein the intake port is configured for connection to a source of a gaseous air-fuel mixture; and
  a first plurality of longitudinally extending burners, each comprising an inlet opening fluidically connected to the output portion of the intake manifold;
at least a first pilot flame burner extending latitudinally relative to the first plurality of longitudinally extending burners, the first pilot flame burner being positioned at approximately a halfway along a length of at least one of the first plurality of longitudinally extending burners;
a second burner deck having a second intake manifold configured to feed the gaseous air-fuel mixture to a second upstream and downstream pluralities of longitudinally extending burners; and
a third burner deck having a third intake manifold configured to feed the gaseous air-fuel mixture to a third upstream and downstream pluralities of longitudinally extending burners.

18. A burner assembly for an oven, comprising:
an intake manifold comprising an intake port, an interior chamber, and an output portion, wherein the intake port is configured for connection to a source of a gaseous air-fuel mixture;
a first plurality of longitudinally extending burners, each of the first plurality of longitudinally extending burners further comprising:
  an inlet opening fluidically connected to the output portion;
  a closed terminal end;
  an internal passage portion extending from the inlet opening to the closed terminal end; and
  a cradle portion disposed midway between the inlet opening and the closed terminal end, each cradle portion comprising a concave recess defined in an upper portion of the internal passage portion, and a convex by-pass portion defining a lower portion of the internal passage portion extending under the cradle portion; and
at least a first pilot flame burner extending latitudinally relative to the first plurality of longitudinally extending burners, the first pilot flame burner being positioned at approximately a halfway along a length of at least one of the first plurality of longitudinally extending burners.

19. The burner assembly according to claim 18, wherein the first pilot flame burner extends across and is nested in all of the cradle portions of the first plurality of longitudinally extending burners.

20. The burner assembly according to claim 19, wherein an upper surface of the first pilot flame burner is disposed at approximately a same height as adjacent upper surfaces of the first plurality of longitudinally extending burners.

21. A burner assembly for an oven, comprising:
an oven enclosure defining an interior;
at least a first conveyor assembly comprising an input end, an output end, and an open-type endless conveyor member supported for rotation causing an upper surface of the open-type endless conveyor member to translate along a conveyance direction;
an intake manifold comprising an intake port, an interior chamber, and an output portion, wherein the intake port is configured for connection to a source of a gaseous air-fuel mixture;
a first plurality of longitudinally extending burners, each comprising an inlet opening fluidically connected to the output portion of the intake manifold; and
at least a first pilot flame burner extending latitudinally relative to the first plurality of longitudinally extending burners, the first pilot flame burner being positioned at approximately a halfway along a length of at least one of the first plurality of longitudinally extending burners.

* * * * *